(12) United States Patent
Nyman et al.

(10) Patent No.: US 10,994,909 B2
(45) Date of Patent: May 4, 2021

(54) PACKAGING MATERIAL AND PACKAGING CONTAINER

(71) Applicant: TETRA LAVAL HOLDINGS & FINANCE S.A., Pully (CH)

(72) Inventors: Ulf Nyman, Eslöv (SE); Cristian Neagu, Epalinges (CH); Mats Aldén, Munka Ljungby (SE); Katarina Jonasson, Bjärred (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/779,323

(22) PCT Filed: Nov. 25, 2016

(86) PCT No.: PCT/EP2016/078752
§ 371 (c)(1),
(2) Date: May 25, 2018

(87) PCT Pub. No.: WO2017/089505
PCT Pub. Date: Jun. 1, 2017

(65) Prior Publication Data
US 2018/0305098 A1    Oct. 25, 2018

(30) Foreign Application Priority Data
Nov. 27, 2015  (EP) .................................... 15196862

(51) Int. Cl.
*B65D 65/40*    (2006.01)
*B32B 5/18*    (2006.01)
(Continued)

(52) U.S. Cl.
CPC .......... *B65D 65/40* (2013.01); *B29C 35/0805* (2013.01); *B32B 1/02* (2013.01);
(Continued)

(58) Field of Classification Search
CPC .......... B65D 65/40; B65D 85/72; C08J 3/247; C08J 9/36; C08J 2201/026; C08J 2301/02;
(Continued)

(56) References Cited

U.S. PATENT DOCUMENTS 5,006,405 A  *  4/1991  Watkins ................. B65D 31/02
                                                               219/113
10,328,666 B2     6/2019  Nyman et al.
(Continued)

FOREIGN PATENT DOCUMENTS

CN    102470649 A    5/2012
EP    2 886 333 A1    6/2015
(Continued)

OTHER PUBLICATIONS

International Search Report (PCT/ISA/210) dated Feb. 23, 2017, by the European Patent Office as the International Searching Authority for International Application No. PCT/EP2016/078752.
(Continued)

*Primary Examiner* — James C Yager
(74) *Attorney, Agent, or Firm* — Buchanan Ingersoll & Rooney PC

(57) ABSTRACT

Described herein are laminated packaging materials comprising foamed cellulose, their use in manufacturing packaging containers, for use in packaging of food products.

7 Claims, 9 Drawing Sheets

(51) Int. Cl.
*C08B 15/10* (2006.01)
*B32B 7/12* (2006.01)
*B32B 27/30* (2006.01)
*C08B 15/00* (2006.01)
*B32B 27/12* (2006.01)
*B32B 27/32* (2006.01)
*B32B 27/06* (2006.01)
*C08L 1/02* (2006.01)
*B32B 27/08* (2006.01)
*B32B 15/20* (2006.01)
*B32B 15/085* (2006.01)
*B32B 5/02* (2006.01)
*B29C 35/08* (2006.01)
*B32B 1/02* (2006.01)
*B32B 23/08* (2006.01)
*B32B 23/16* (2006.01)
*B65D 85/72* (2006.01)
*C08J 3/24* (2006.01)
*C08J 9/36* (2006.01)
*B29C 48/21* (2019.01)
*B29K 1/00* (2006.01)
*B29K 105/04* (2006.01)
*B29L 31/00* (2006.01)
*B32B 37/20* (2006.01)

(52) U.S. Cl.
CPC ............... *B32B 5/02* (2013.01); *B32B 5/18* (2013.01); *B32B 7/12* (2013.01); *B32B 15/085* (2013.01); *B32B 15/20* (2013.01); *B32B 23/08* (2013.01); *B32B 23/16* (2013.01); *B32B 27/065* (2013.01); *B32B 27/08* (2013.01); *B32B 27/12* (2013.01); *B32B 27/308* (2013.01); *B32B 27/32* (2013.01); *B65D 85/72* (2013.01); *C08B 15/00* (2013.01); *C08B 15/10* (2013.01); *C08J 3/247* (2013.01); *C08J 9/36* (2013.01); *C08L 1/02* (2013.01); *B29C 48/21* (2019.02); *B29K 2001/00* (2013.01); *B29K 2105/04* (2013.01); *B29L 2031/712* (2013.01); *B32B 37/203* (2013.01); *B32B 2255/10* (2013.01); *B32B 2255/205* (2013.01); *B32B 2262/062* (2013.01); *B32B 2266/02* (2013.01); *B32B 2307/31* (2013.01); *B32B 2307/72* (2013.01); *B32B 2307/7265* (2013.01); *B32B 2439/40* (2013.01); *B32B 2439/70* (2013.01); *B32B 2451/00* (2013.01); *C08J 2201/026* (2013.01); *C08J 2301/02* (2013.01)

(58) Field of Classification Search
CPC ....... B29C 35/0805; B29C 48/21; B32B 1/02; B32B 23/08; B32B 23/16; B32B 5/02; B32B 27/32; B32B 27/308; B32B 27/12; B32B 27/08; B32B 27/065; B32B 15/085; B32B 7/12; B32B 5/18; B32B 37/203; B32B 2266/02; B32B 2451/00; B32B 2439/40; B32B 2307/7265; B32B 2307/72; B32B 2307/31; B32B 2262/062; B32B 2255/205; B32B 2255/10; B32B 15/20; C08L 1/02; C08B 15/10; C08B 15/00; B29K 2001/00; B29K 2105/04; B29L 2031/712
See application file for complete search history.

(56) References Cited

U.S. PATENT DOCUMENTS

| 2013/0171439 | A1* | 7/2013 | Shoseyov | B82Y 30/00 428/220 |
| 2018/0304607 | A1 | 10/2018 | Öhman et al. | |
| 2018/0311940 | A1 | 11/2018 | Toft et al. | |
| 2018/0319559 | A1 | 11/2018 | Toft et al. | |
| 2018/0354690 | A1 | 12/2018 | Collaud et al. | |
| 2019/0202191 | A1 | 7/2019 | Toft et al. | |

FOREIGN PATENT DOCUMENTS

| EP | 2 889 231 A1 | 7/2015 | |
| EP | 2 949 597 A1 | 12/2015 | |
| WO | WO 00/30846 A1 | 6/2000 | |
| WO | WO 00/64667 A1 | 11/2000 | |
| WO | WO-2011003566 A1 * | 1/2011 | ............. B32B 27/10 |
| WO | WO 2012/163753 A1 | 12/2012 | |
| WO | WO 2015/034426 A1 | 3/2015 | |
| WO | 2015/140097 A1 | 9/2015 | |

OTHER PUBLICATIONS

Written Opinion (PCT/ISA/237) dated Feb. 23, 2017, by the European Patent Office as the International Searching Authority for International Application No. PCT/EP2016/078752.
U.S. Appl. No. 15/779,358, filed May 25, 2018 entitled "Laminated Packaging Material, Packaging Containers Manufactured Therefrom," published as U.S. Application Publication No. US 2018/0311940.
U.S. Appl. No. 15/779,205, filed May 25, 2018 entitled "Method of Manufacturing a Laminated Packaging Material, the Packaging Material Obtained by the Method and Packaging Containers Manufactured Therefrom," published as U.S. Application Publication No. US 2019/0202191.
U.S. Appl. No. 15/780,329, filed May 31, 2018 entitled "Laminated Packaging Material, Packaging Containers Manufactured Therefrom and a Method for Manufacturing the Laminate Material," published as U.S. Application Publication No. US 2018/0354690.
U.S. Appl. No. 15/779,336, filed May 25, 2018 entitled "Method for Manufacturing a Laminated Packaging Material, the Laminated Packaging Material and Packaging Containers Made Therefrom," published as U.S. Application Publication No. US 2018/0304607.
U.S. Appl. No. 15/779,285, filed May 25, 2018 entitled "Laminated Packaging Material, Packaging Containers Manufactured Therefrom and a Method for Manufacturing the Laminate Material," published as U.S. Application Publication No. US 2018/0319559.
Office Action (The First Office Action) dated Aug. 15, 2019, by the State Intellectual Property Office of People's Republic of China in corresponding Chinese Patent Application No. 201680069372.7 and an English Translation of the Office Action. (20 pages).

* cited by examiner

PACKAGING MATERIAL AND PACKAGING CONTAINER

TECHNICAL FIELD

Described herein are packaging materials for packaging containers for liquid or semi-liquid food, its method of production and use thereof.

BACKGROUND

Packaging containers of the disposable type for liquid foods are often produced from a packaging material based on paperboard or carton. One such commonly occurring packaging container is marketed under the trademark Tetra Brik® Aseptic and is principally employed for aseptic packaging of liquid foods such as milk, fruit juices etc, marketed and sold for long term ambient storage. The packaging material in this known packaging container is typically a laminate comprising a bulk layer of paper or paperboard and outer, liquid-tight layers of thermoplastics. In order to render the packaging container gas-tight, in particular oxygen gas-tight, for example for the purpose of aseptic packaging such as packaging of milk or fruit juice, the packaging material laminate in these packaging containers normally comprises at least one additional layer, providing gas barrier properties, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat-sealable adhesive polymers and/or heat-sealable polyolefins. Also on the outside of the paper or paperboard bulk layer, there is an outermost heat-sealable polymer layer (decor layer). The heat-sealable polymer layers are often based on low density polyethylene or blends thereof.

The packaging containers are generally produced by means of high-speed packaging machines of the type that continuously form, fill and seal packages from a web of packaging material, e.g. Tetra Brik® Aseptic-type packaging machines. Packaging containers may thus be produced by the so-called form-fill-seal technology basically including continuous forming a web into a tube of the laminated packaging material by means of a filling machine which forms, fills and seals the web into packages. According to another method, packages are made one by one from pre-fabricated blanks of packaging material, e.g. in Tetra Rex®-type filing machines, thus providing so-called gable-top shaped packages, or other blanks-based packages.

An aspect of the continuous Tetra Brik®-type packaging method is, as stated above, the possibility of high-speed packaging, which has considerable impact on cost efficiency. Typically, many thousands of packages may be prepared per hour. For example the Tetra Pak® A3/speed may manufacture about 15 000 packages per hour (family-size packaging containers of 0.9 liters and above), and about 24 000 packaging containers per hour (portion packages).

There have been attempts to modify a paperboard laminate by replacing the paperboard bulk layer by a polymer foam, as for example described in WO00/30846. Such attempts did, however, not come to practical products, because foams from cost-efficient polymers normally deteriorate and collapse when exposed to high temperature and pressure during the conversion of the materials into a laminated material. This is a particular problem during polymer melt extrusion lamination operations, wherein polymer foams collapse by the heat of the molten polymer and the pressure in the lamination nip, but also during lamination steps, in which layers having pre-coated surfaces of a thermoplastic polymer or adhesive, are brought to adhere to each other by simultaneous application of heat and pressure in a heated roller nip, i.e. so-called rotational heat-pressure lamination.

Objects

One object is to manufacture a laminated packaging material and packaging containers for liquid and semi-liquid food manufactured from the packaging material, that reduces or obviates the above described problem of the prior art.

It is a further object to produce such a packaging material laminate, in which a foamed or porous or air-filled fibrous bulk layer endures heat-pressure lamination without losing its original thickness during lamination operations and, thus, has provided an adequate bulk thickness in the final laminate with a low density of the bulk material.

It is still a further object to produce such a packaging material laminate which is optimized to both have such retained bulk thickness and density on the one hand, as well as appropriate mechanical durability such as e.g. delamination strength, compression strength for machine direction and cross direction, and Z directional strength. These properties are important for the stacking strength of packages. In addition, by improved mechanical properties forming defects like denting of packaging containers, e.g. corner fold denting, pinching of side panels, horizontal or vertical crease dents, may be reduced. In addition lowered edge wick is obtainable.

It is a further object to design such a lighter and more cost efficient packaging material structure provided with a print surface, gas barrier properties and having mechanical durability.

DETAILED DESCRIPTION

Described hereinafter are aspects relating to a laminated packaging material which in detail is discussed and exemplified herein. Some aspects are related to a method of preparing the packaging material. Additionally some aspects are relating to the use of the packaging material in providing packaging containers suitable for liquid and semi-liquid food products. The packaging material is in one aspect used in a filling machine for liquid or semi-liquid food products, for example of the form-fill-seal type, such as a Tetra Pak® A3 filling machine, for manufacture of aseptic packaging containers. In some aspects the packaging containers are manufactured from a roll-fed web of packaging material. In some aspects the packaging containers are manufactured from a blank of packaging material.

The packaging material provided in embodiments, example and aspects herein relates to a packaging material comprising a bulk layer having a density of less than 700 kg/m$^3$.

The following terms and definitions used herein are to be given the definition herein below.

A "polyolefin" or "polyalkene" is a polymer produced from a simple olefin of the formula $C_2H_{2n}$ as a monomer.

A "polyethylene" is a polyolefin produced by polymerizing the monomer ethylene.

A "copolymer" or "heteropolymer" is a polymer of two or more monomeric species.

A "high density polyethylene" or "HDPE" is an ethylene polymer having a density of more than 0.941 g/cm$^3$.

A "low density polyethylene" or "LDPE" is a polyethylene homopolymer having a density from 0.910 to 0.935 g/cm$^3$. LDPE is also known as branched or heterogeneously branched polyethylene because of the relatively large number of long chain branches extending from the main polymer backbone. LDPE has been commercially manufactured since the 1930s and is well known in the art.

A "linear low density polyethylene" or "LLDPE" refer to a polyethylene copolymer having a density from 0.89 g/cm$^3$. LLDPE is linear and does not substantially contain long chain branching, and generally has a narrower molecular weight distribution than conventional LDPE. The traditional "linear low density polyethylene" (LLDPE) can be produced with conventional Ziegler-Natta catalysts. LLDPE has also been commercially manufactured for a long time (since the 1950s by solution reactors, and since the 1980s by gas phase reactors) and is also well known in the art.

An "mLLDPE" is a linear low density polyethylenes produced by metallocene catalysts in gas phase reactors and/or with metallocene catalysts in slurry reactors and/or with any of the haftocene catalysts in solution reactors. The mLLDPE polymers are well known in the art of packaging technology.

A "blank" means a pre-manufactured, flat un-folded tubular sheet of a packaging material. An example of a packaging material of a blank comprises bulk layer and liquid tight plastic coatings on each side of the bulk layer. The blank is used to manufacture sealed packaging containers by erecting the blank to an open tubular sleeve which is transversally sealed in one end before filling and transversally sealing the open end.

A "thickness" referring to the packaging material, a packaging container, or layers thereof, is unless otherwise defined determined by microscopy, for example by a suitable microscope such as those marketed under the name Olympus, for example BX51.

"Liquid or semi-liquid food" generally refers to food products having a flowing content that optionally may contain pieces of food. Dairy and milk, soy, rice, grains and seed drinks, juice, nectar, still drinks, energy drinks, sport drinks, coffee or tea drinks, coconut water, tea drinks, wine, soups, jalapenos, tomatoes, sauce (such as pasta sauce), beans and olive oil are some non-limiting example of food products contemplated.

"Aseptic" in connection with a packaging material and packaging container refers to conditions where microorganisms are eliminated, in-activated or killed. Examples of microorganisms are bacteria and spores. Generally an aseptic process is used when a product is aseptically packed in a packaging container.

The term "heat-sealing" refers to the process of welding one surface of a thermoplastic material to another thermoplastic surface. A heat-sealable material should, under the appropriate conditions such as applying sufficient heating and pressure, be able to generate a seal when pressed against and in contact with another suitable thermoplastic material. Suitable heating can be achieved by induction heating or ultrasonic heating or other conventional contact or convection heating means, e.g. hot air.

The term "weakening" is intended to mean a material weakening such as a creasing, perforation or the like.

The term "attenuation" means a portion of the packaging material comprising at least one, but not all, of the layers of the packaging material. The attenuation can for example be an opening, slit or recess as long as it is covered by at least one of the layers of the packaging material. As one example the attenuation is a continuation of the barrier layer and the heat-sealing innermost layer of the packaging material wherein the bulk layer has been cut-out making up the boundaries of the attenuation, for the purpose of facilitating opening of the packaging container.

With the term "bulk layer" is normally meant the thickest layer or the layer containing the most material in a multi-layer laminate, i.e. the layer which is contributing most to the mechanical properties and the dimensional stability of the laminate and of packaging containers folded from the laminate. In the context of the present invention, it may also mean the layer providing a greater thickness distance in a sandwich structure, which further interacts with stabilising facing layers, which have a higher Young's modulus, on each side of the bulk layer, in order to achieve sufficient such mechanical properties and dimensional stability.

Laminated packaging materials are obtained by various methods for laminating layers together, such as extrusion lamination, wet or dry adhesive lamination, heat-pressure lamination, and may also be including various coating methods. Although the particular lamination technique is not crucial in order to achieve the benefits of aspects and embodiments described herein, extrusion lamination is one example which may suitably be used to produce laminated packaging materials, in particular carton-based packages used for food such as liquid and semi-liquid food.

According to aspects and embodiments disclosed herein, a packaging container having a long shelf-life is provided, the shelf-life is not less than 3, 6, 8, 9, 10, 11, 12, 13, 14, 15 months. Naturally a long shelf-life is preferred. Generally a shelf life of at least 12 months is required, which however may vary upon different preferences. In one aspect a packaging container made from the packaging material described herein has a shelf-life of 12 months.

In particular, such a laminated packaging material comprises a bulk layer, comprising a layer of a foam-formed fibrous cellulose, hereinafter called foamed cellulose. Foamed cellulose is accordingly a fibrous web layer, with tunable density, that can be manufactured by a foam forming process. The bulk layer is arranged to provide for the most efficient contribution to the flexural rigidity of the laminate. The bulk layer used herein has a surface weight grammage of at least 20 g/m$^2$. In some embodiments the grammage is between 20-440 g/m$^2$. The grammage is for example dependent on the requirements conferred by different types of packages. The grammage of the bulk layer is assessed in accordance with ISO 536. Surface weight grammage expresses weight per unit area and is measured in g/m$^2$. The bulk layer normally has a thickness between 80-1100 µm, and is appropriately selected in order to obtain the desired stiffness suitable for the type of packaging container and the intended food product. The bulk layer thickness can be assessed by microscopy as discussed herein below. The foamed cellulose provides at least 20%, such as at least 25% such as at least 30%, such as at least 40% of the thickness of the bulk layer. The percentages may be determined by examining the cross-section of the packaging material in a microscope.

The bulk layer may according to some aspects and embodiments be surface-treated or surface-coated in order to improve adhesion and compatibility between surrounding layers of the packaging laminate, and/or to obtain additional desired properties such as improved stiffness. Such surface treatment may be provided by means of exposure of the material surface to corona, ozone or flame treatments, or the like.

The bulk layer has for example a thickness from 80 to 1100 µm, such as from 90 to 800 µm, such as from 150 to 600 μm, such as from 200 to 550 μm, such as from 250 to 350 μm. Expressed as surface weight, g/m², a corresponding suitable range is from 20 to 440 g/m², such as from 25 to 350 g/m², such as from 45 to 250 g/m², such as from 60 to 220 g/m², such as from 60 to 200 g/m². A suitable bulk layer for aspects and embodiments disclosed herein comprises mainly foamed cellulose. According to one embodiment the laminate comprises a bulk layer comprising foamed cellulose and at least one additional paper layer.

The bulk layer, which includes a foamed cellulose layer and optionally an additional cellulose layer, may be provided with coatings such as for example clay coating, or may be surface modified. Such coatings or surface modifications may also be suitable for application to an additional layer, which is for example intended for printing, and arranged between the bulk layer (optionally including an additional cellulose layer) and the decor layer. The bulk layer, optionally including an additional layer, can be surface modified or there may be an adhesive or binding layer in order to facilitate the compatibility and bonding between the bulk layer and additional layers.

The bulk layer comprises foamed cellulose and is characterized by a density less than 700 kg/m³, such as from 100 to 600 kg/m³, such as from 100 to 500 kg/m³, such as from 200 to 500 kg/m³, such as from 200 to 400 kg/m³, such as from 300 to 500 kg/m³, such as from 300 to 400 kg/m³. In some aspects and embodiments the bulk layer is comprised of foamed cellulose and the bulk layer has a density less than 700 kg/m³, from 100 to 600 kg/m³, such as from 100 to 500 kg/m³, such as from 200 to 500 kg/m³, such as from 200 to 400 kg/m³, such as from 300 to 500 kg/m³, such as from 300 to 400 kg/m³. The lower the density of the foamed cellulose layer, the higher cost-efficiency regarding raw materials consumed, while better resistance to thickness reduction properties of a foamed cellulose was obtained at above 300 kg/m³. According to an embodiment, the optimal density of foamed cellulose to be used in laminated packaging materials has been concluded to be from 300 to 500 kg/m³, in particular from 300 to 400 kg/m³.

In some embodiments the packaging materials comprise a bulk layer having a thermoplastic material decor layer i.e. to be the outer heat-sealable side of the filled and sealed packaging container. The side of the bulk layer which is to be the outer side of the closed and sealed packaging container may contain a print covered by the decor layer.

According to aspects and embodiments disclosed herein the bulk layer provides an opportunity to incorporate a foamed cellulose, into a laminated packaging material suitable for preparing packaging containers for food products, especially for liquid and semi-liquid food products. Lamination of the bulk layer to polymer layers may be carried out by melt extrusion operations, like extrusion coating and extrusion lamination of the plastic layers. The extrusion is generally done at high temperatures such as, in the case of low density polyethylenes, up to about 330° C. Such temperatures have been shown not to be a major problem for a bulk layer comprising foamed cellulose, in contrast to bulk layers of foamed polymer layers. The foamed cellulose has a low heat transfer and thermal stability above 300° C., while foamed polymer layers in general and foamed polyolefin layers in particular, have not. Polyolefins would provide the most realistic and feasible foamed polymer alternative from a cost and environmental perspective. It has been seen that at relatively low densities of from 300 to 400 kg/m³, foamed cellulose does not significantly lose thickness in extrusion lamination operations, and maintains sufficient delamination strength and so-called z-strength, for use in packaging laminates for the purpose of the invention.

The foamed cellulose is crosslinked using radiation. The subjection to radiation and crosslinking of the foamed cellulose is performed by subjecting the foamed cellulose directly, the bulk layer comprising foamed cellulose or the at least partially finished packaging material to radiation. By crosslinking the foamed cellulose material, the result is an increase in bonding between the fibers and, in turn, a decrease in the amount of cellulose fibers needed in a paper material. In addition the edge wick may be lowered. The crosslinking using radiation may be performed using ultraviolet (UV) and/or electronbeam (EB) radiation. By crosslinking the fiber network of the paper, strength and stiffness properties are improved. By covalently bonding polymer chains more mechanically and thermally stable materials are obtained. By using radiation the crosslinking material may be cured faster resulting in faster production speeds.

Radiation curing may be performed by radical polymerisation or cationic polymerization.

For radical polymerisation using UV at least a crosslinkable polymeric, oligomeric and/or monomeric material and a photoinitiator is needed. If EB radiation is used at least a crosslinkable polymeric, oligomeric and/or monomeric material is needed, as a photoinitiator is not required.

As an alternative to radical polymerisation cationic polymerisation may be used. Cationically-cured materials are based on epoxy or vinyl ether compounds that polymerize in the presence of an acid. The photoinitiator used in cationically-cured compositions generates a Bronsted acid upon exposure to UV light. A difference between UV and EB curing of cationically cured materials is that EB curing only requires a small amount of the photoinitiator.

The foamed cellulose used herein may be functionalised to become a chemically modified foamed cellulose. Alternatively a portion of the foamed cellulose may be functionalised, and may thereafter be added to the other foamed cellulose of the bulk layer. The foamed cellulose fibers may be subjected to an esterification, etherification or grafting, before the crosslinking.

To esterify cellulose fibers, the cellulose may be subjected to an organic acid, organic acid anhydride or alcohol with an acid chloride. Carboxylic acid or an anhydride thereof may be used to obtain esterified cellulose fibers. By doing so ester groups are attached to the cellulose fibres. Pretreatment of the cellulose fibers through an acrylic esterification reaction may enhance radiation curing since polyester and acrylate groups are reactive for e.g. UV or EB radiation.

To etherify cellulose fibers, the cellulose may be subjected to hydrogen containing chlorides like methyle chloride or ethyl chloride in the presence of auxiliary substances like hydroxides, e.g. sodium hydroxide, to obtain etherified cellulose fibers. By doing so ether groups are attached to the cellulose fibres. Suitable cellulose ethers may be selected from methylcellulose (MC), methyl hydroxy ethyl cellulose (MHEC), hydroxypropyl methyl cellulose (MHPC), hydroxyethyl cellulose (HEC), hydroxypropyl cellulose (HPC), carboxyl methyl cellulose (CMC) and any combination thereof.

The cellulose may also be grafted with desirable functional groups before the crosslinking.

Instead of modifying the foamed cellulosic material, additional polymeric, oligomeric and/or monomeric materials may be added to the foamed cellulose material. The polymeric, oligomeric and/or monomeric materials act as crosslinkers between cellulose fibres of the foamed cellulose, which bring about property changes to the cellulosic material.

Oligomeric materials may be selected from unsaturate polyesters and acrylated polyester, acrylated epoxy resin, acrylated urethanes and vinyl urethanes, acrylated silicone resins, acrylated polyethers, and acrylated oils and any combination thereof.

Monomeric materials may be selected from vinyl based diluents, such as methyl styrene, vinyl toluene and vinyl acetate; acrylics; diacrylates; triacrylates; tetracrylates; and pentacrylates; and any combination thereof.

The additional polymeric, oligomeric and/or monomeric materials may be selected from the group modified cellulose, acrylates, polyvinylic compounds, polyamine compounds, polyamide compounds, propylene glycol, triethylene glycol, chitosan glutaraldehyde, epoxides, glyoxal, (methacrylated) gelatin, chitosan, caseinates, amylos, amylopectin and starch and derivatives thereof.

The additional polymeric, oligomeric and/or monomeric materials may be modified cellulose, which may be selected from methylcellulose (MC), methyl hydroxy ethyl cellulose (MHEC), hydroxypropyl methyl cellulose (MHPC), hydroxyethyl cellulose (HEC), hydroxypropyl cellulose (HPC), carboxyl methyl cellulose (CMC) and any combination thereof.

The additional polymeric, oligomeric and/or monomeric materials may be selected from acrylates, which may be selected from epoxy (meth)acrylates, polyester (meth)acrylate and acrylic (meth)acrylate. Poly(acrylic acid) (PAA) is an acrylate polymer. The size of the monomeric materials affects the crosslinking and properties of the crosslinked material. Preferably high molecular weight molecules are used, which favour interfiber (between fibres) crosslinking and improves the dry strength and toughness of the material. The monomeric materials may be monofunctional, difunctional or trifunctional or above. The monomeric materials may be selected from (meth)acrylates. The acrylates may be selected from the group comprising N-(hydroxymethyl) acrylamide (HMAA), 1.6-hexanediol diacrylate (HDODA), trimethylolpropane triacrylate (TMPTA), dipentaerythritol pentaacrylate, hexanedioldiakrylate, di-trimetylolpropantetracrylate, tripropylene glycol diakrylate (TRPGDA), tripropylene glycol diacrylate (TPGDA), propoxylated glyceryl triacrylate (GPTA), pentaerythritol triacrylate (PETA), ethoxylated trimethylolpropane triacrylate (TMPEOTA), trimethylolpropane trimethacrylate (TMPTMA), ditrimethylolpropane tetraacrylate (DITMP4A), dipentaerythritol hexaacrylate (DPHA) and any combination thereof.

The additional polymeric, oligomeric and/or monomeric material may be selected from polyvinylic compounds, e.g. selected from poly(vinyl pyrrolidone) (PVP), poly(vinyl alcohol) (PVA), polyvinylamine (PVAm) and polyvinyl acetate (PVAc) and any combination thereof.

The additional polymeric, oligomeric and/or monomeric material may be selected from polyamine compounds, e.g. polyvinylamine (PVAm) and polyamidoamine (PAMAM) and any combination thereof.

The additional polymeric, oligomeric and/or monomeric material may be selected from polyamide compounds, e.g. polyacrylamide (PAM) and methylenebiscarylamide and any combination thereof.

In some embodiments acids may be added to improve the effect of the monomeric, oligomeric and polymeric crosslinkable materials, such acids may be organic acids, e.g. carboxylic acids. The carboxylic acids may be chosen from saturated carboxylic acids, dicarboxylic acids and tricarboxylic acids. Examples of such acids are citric acid, acrylic acid, adipic acid, formic acid, propanoic acid, itaconic acid etc, and any combination thereof.

Preferably the selected polymeric, oligomeric and/or monomeric materials are selected from materials which are approved for applications within the food industry, such as FDA approved materials, like starch, PVA, CMC and TMPTA.

Depending on the type of radiation used for the crosslinking optionally a photoinitiator is used. UV radiation require the use of a photoinitiator. The photoinitiator may be selected from the group aromatic ketones and amines, alkyl benzoin ethers, thioxathones and derivatives, alcylphosphine oxide, ketoxime ester, cationic curing quaternary ammonium salts, acetophenone derivatives. Examples of photoinitiators are methanone, acetophenone, benzophenone, hioxanthones, benzil, and quinones and derivatives thereof. A methanone may be 1-hydroxycyclohexyl phenyl ketone (HCHPK), and an acetophenon may be 2,2-dimethoxy-2-phenylacetophenon (DMPA).

In one embodiment of the present invention a mixture of polymeric, oligomeric and/or monomeric material and optional photoinitiator is added to the foamed cellulose. Additional components may be provided in the mixture e.g. solvents, like water and/or alcohols, e.g. methanol, ethanol, and/or propanol.

The additional polymeric, oligomeric and/or monomeric material and optional photoinitiator mixture may be applied to the foamed cellulose by a method selected from by soaking, roller coating, rod coating, blade coating and spraying. Soaking may be performed for 2-25 seconds, e.g. 5-20 seconds, or 5-15 seconds.

The additional polymeric, oligomeric and/or monomeric material may be added to the foamed cellulose in an amount of about 1-60% by weight of the foamed cellulose, such as 5-50% by weight, 10-40% by weight, or 5-15% by weight.

The photoinitiator may be added to the foamed cellulose in an amount of about 0.05-5% by weight of the foamed cellulose, such as 0.5-2% by weight.

Before the foamed cellulose comprising a mixture of additional polymeric, oligomeric and/or monomeric material and optional photoinitiator is crosslinked the treated foamed cellulose may be subjected to a drying step. A drying step may be used to evaporate any solvent present. Water and/or alcohol solvent may be evaporated. The drying step may be performed at room temperature or at elevated temperatures, e.g. about 40-80° C. This is influenced by the desired drying time.

The exposure time to radiation affects the crosslinking and thus also the properties of the material. According to one embodiment the radiation exposure is provided by a mercury lamp. The effect of the UV lamp may be about 1800 W, and provided as e.g. 120 W/cm. The exposure time may be about 0.5-30 seconds. The exposure time is dependent upon lens width, conveyer belt speed and amount of passages.

EB radiation may use shorter exposure times compared to UV radiation. The dosage during EB radiation may be about 50-200 kGy at 100-1000 keV.

Independent of the method of curing the crosslinking material, EB or UV, the polymers and/or monomers included in the foamed cellulose are to be crosslinked to a sufficient degree, in order to limit migration of undesirable components into the contents of a container formed by the packaging material comprising said foamed cellulose.

Subjecting the foamed cellulose to moisture may further affect the crosslinking. The crosslinking may be performed in the presence of absorbed water in the foamed cellulose.

Especially if urethane groups are present in the crosslinked foamed cellulose, additional curing may occur. Such moisture curable polyurethanes may further improve the properties of the crosslinked foamed cellulose and bulk layer.

The bulk layer comprising foamed cellulose as described in aspects and embodiments herein, further provides the desired strength against delamination, i.e. it does not easily delaminate under standard conditions. The delamination strength can be determined by for example the Huygen Internal Bonding Energy testing device which follows TAPPI T569 and provides a value of $J/m^2$ where the packaging material herein is about 120-300 $J/m^2$, such as about 150-280 $J/m^2$, 180-250 $J/m^2$, 190-220 $J/m^2$, 200-210 $J/m^2$ or 200-205 $J/m^2$. In some aspects and embodiments the bulk layer is providing a distance between a barrier layer and an outermost thermoplastic decor layer, and is thereby enabling tailor-made laminated packaging material structures. In some embodiments the bulk layer comprising foamed cellulose provides delamination strength in combination with compression strength in the thickness direction, which provides sufficient distance between the barrier layer and the decor layer.

The bulk layer comprising foamed cellulose further provides reduced edge wick properties determined by the Edge wick index. The edge wicking index is defined as the amount of test solution absorbed by the edges of test pieces under specified testing conditions. The result is given in $kg/m^2$. A water resistant tape is applied on both sides of the cellulose sheet material. Samples are then cut out in the dimension 75 mm (CD)×25 mm (MD). A 1% lactic acid solution is used as test solution. The temperature during measurements shall be 23° C. The samples are measured for weight before soaking and after soaking. Soaking takes place during 1 hour. The edge wick is then calculated as the difference in weight after and before soaking divided by the total area of the sample edges. The total area of the sample edges is given by the total edge length (0.075+0.075+0.025+0.025) times the thickness of the cellulose sheet material. The aim of the method is to evaluate the sample's ability to resist penetration of the test liquid. The edge wick index is preferably in the range of about 0.1-4 $kg/m^2$, such as 0.1-3 $kg/m^2$, 0.1-2 $kg/m^2$, or 0.1-1.5 $kg/m^2$. To improve the resistance to edge wicking further, sizing chemicals such as AKD may be added to the fibrous network.

Foamed cellulose can be generated by mixing cellulose fibers and a foaming fluid, such as water and optionally a surfactant such as sodium dodecyl sulphate (SDS). The amount of the surfactant should be 0.1 w % to 20 w %, such as 0.5 w % to 10 w %, such as 1 w % to 5 w % such as 1.5 w %-3w %. A rotor mixer on a general foam-generator generates the foamed cellulose. The foam is generally formed by bringing a gas into the mixture. Air is an example of an appropriate gas. Another suitable gas is oxygen. Generally the gas is brought into the mixture by pressurized gas and by the vortex caused by stirring. Generally the cellulose is provided as a liquid dispersion comprising cellulose fibers. An example of liquid is water. Some examples of cellulose fibers are cellulose based fibers such as chemical pulp fibers, chemi-thermomechanical pulp fibers, thermo-mechanical pulp fibers, and Kraft pulp fibers. The fibre dispersion may for example be added to the foaming fluid after a foam has been generated by the fluid (including the surfactant). Optionally, the liquid dispersion comprising cellulose fibers may be combined with the foaming fluid prior to foaming. An additive, for controlling the consistency of the foam may be added, if necessary. The foamed cellulose generated as described herein is run through a nozzle arrangement ("headbox") where pressure and forming tools generate a web of foamed cellulose which is rolled onto a reel, after at least partly drying, and stored before future use to prepare for example a packaging material. Optionally the foamed cellulose web can be used in-line, i.e. directly applying additional layers in order to transform the foamed cellulose web to a laminated packaging material for liquid or semi-liquid food packaging. Compared to traditional paper manufacturing, additional or modified drying may suitably be used in order to achieve the desired dryness and density.

In some embodiments the foamed cellulose may be mixed with other materials, for example additives, and/or microfibrillar cellulose (MFC), and/or carbon nanofibers (CNF), and/or refined fibres and/or refined pulp, and/or strength chemicals or agents, such as starch and derivatives thereof, mannogalactans, carboxymethyl cellulose, melamine-formaldehyde colloids, urea-formaldehyde resins, polyamide-polyamine-epichlorhydrin resins.

MFC may be added in an amount of 2-30% by weight of the foamed cellulose, such as 5-25 wt %, or 10-20 wt %. MFC is able to build bridges between individual long fibres and thus provide additional good strength properties to the fibre web.

In some embodiments the packaging materials comprise an additional layer between the decor layer and the bulk layer. The additional layer can for example be a paper or paperboard layer or a polymer film. The additional layer may contain a print on the side which is to become the outside of the packaging container. Whenever the additional layer is a paper, paperboard or cellulose layer, a grammage of at least 20 $g/m^2$ and in some embodiments between 20 and 100 $g/m^2$ are suitable. The paper layer may be coated with a white clay layer to improve the whiteness of the surface. Whenever the additional layer is a polymer film its thickness should be between 10-50 μm. Example of suitable films are oriented pre-manufactured films such as BOPP (biaxially oriented polypropylene), BoPET (biaxially oriented polyethylene terephthalate), polyamide, and oriented high density polyethylene films.

In some embodiments the additional layer is selected from a paper layer having a grammage of between 20 and 100 $g/m^2$ and a polymer film having a thickness of 10-50 μm.

According to aspects and embodiments disclosed herein the packaging material comprises a bulk layer having a density of less than 700 $kg/m^3$ and comprising foamed cellulose, said packaging material further comprises an additional layer arranged by help of a binding layer, such as for example a thermoplastic polymer binding layer, such as a polyolefin-based polymer or copolymer binding layer, wherein the binding layer is arranged between the bulk layer and the additional layer, and said additional layer on the side opposite the binding layer has a decor layer arranged, said bulk layer, on the side opposite the binding layer is provided with a barrier layer, which on the side opposite the bulk layer is provided with a heat-sealable layer. The decor layer is a polyolefin layer such as the above mentioned outermost heat-sealable polyolefin layer to be in contact with the surroundings of a packaging container, for example LDPE or polypropylene. The decor layer provides additional protection, e.g. moisture resistance and scratch/wear resistance, and stability to the packaging container.

The decor layer is comprised of a heat-sealable polyolefin layer(s) facing the surrounding environment of a resulting packaging container, suitable polyolefins are polyethylene of the low density type, selected from the group consisting of LDPE, LLDPE, VLDPE, ULDPE or mLLDPE and blends of two or more thereof, optionally other polyolefins such as high density polyethylene (HDPE), polypropylene or propylene co- or ter-polymers are useful as the layer facing the surroundings. The decor layer may be applied by extrusion coating or other suitable techniques. An example of polyethylenes for use as a decor layer is a LDPE of extrusion grade, for example having a LDPE having a melt flow index (as determined in accordance with ASTM D1238, 190° C./2.16 kg) of 4-15, such as 6-9, and a density (as determined in accordance with ISO 1183, method D) of 915-922 kg/m$^3$, such as 918-920 kg/m$^3$ The thickness of decor layer of the packaging material is for example between 5 µm-50 µm such as 7 µm-30 µm, such as 7 µm-20 µm, such as 8 µm-15 µm.

On the side of the bulk layer opposite the decor layer and hence facing the inside of the final packaging container, a barrier layer is arranged, for example by means of an intermediate laminate layer which could be a polyolefin-based layer of for example HDPE, LDPE, polypropylene, or another suitable thermoplastic polymer layer such as ethylene-acrylic acid copolymer (EAA), which further facilitates adhesion between the bulk layer and the oxygen barrier. Optionally the bulk layer and/or the barrier layer can be treated or modified in order to achieve adhesion between the layers, in which case the laminate layer may not be needed. For example a coating which modifies the surface of one or more of the substrates may be used. In some embodiments the barrier layer is selected from a paper layer, an aluminium foil, and a barrier film or coating. When an aluminium foil is used a suitable thickness is between 3-15 µm, such as 5-10 µm, such as 5-8 µm. In some embodiments the barrier layer may be applied with a substrate layer. Such a substrate layer may be made of a thin high density paper having a grammage of about 20-100 g/m$^2$, such as 20-80 g/m$^2$ or 30-70 g/m$^2$. The substrate layer may be applied to at least one side of the barrier layer. The laminate layer is in an embodiment applied by an extrusion process using commercially available extrusion equipment. Materials, suitable as laminate layer, are known and conventionally comprise a polyolefin. According to one embodiment the laminating material comprises a polyethylene or blends thereof. Within the group of polyethylenes, the properties of laminating layers can be varied and tailored in order to achieve various final properties in a packaging material. Variations of the laminate layer for the desired type of packaging material for liquid and semi-liquid foods are thus found largely within the group of polyethylene polymers. Suitable LDPE grades are for example manufactured by Dow, Exxon Mobile, Borealis, and Ineos etc, such grades are well known to the skilled person. The laminate layer may also be selected from copolymers of ethylene and other alpha-olefin monomers which of course include, for example, linear low-density polyethylenes, also copolymers of ethylene and propylene in different proportions, for example so-called plastomers or elastomers of the type marketed by Dow under the names "Engage" and "Affinity", as well as ethylene-(meth)acrylic acid copolymers and also terpolymers of ethylene, propylene and an alpha-olefin monomer having polyethylene-like properties. Examples of polymers that can help to improve various mechanical properties are so called linear polyolefins, for example high-density polyethylene (HDPE), medium-density polyethylene (MDPE), linear low-density polyethylene (LLDPE/VLDPE/ULDPE) produced with conventional catalysts or with so-called single-site catalysts, or constrained-geometry catalysts, including so-called metallocene-LLDPE (mLLDPE), and polypropylene (PP). Very low density polyethylene (VLDPE) and ultra low density polyethylene (ULDPE) are examples of subcategories within the category of linear low density polyethylenes. Depending on the type and quantity of comonomer, these polymers generally have greater durability in several respects. Variations of the laminating material for the desired type of packaging material for beverages and liquids are found within the group of polyethylene polymers, for example polymers chosen from the group that includes low-density polyethylene (LDPE), high-density polyethylene (HDPE), medium-density polyethylene (MDPE), linear low-density polyethylene (LLDPE/VLDPE/ULDPE) produced with conventional catalysts or with so-called single-site catalysts, or constrained-geometry catalysts, including so-called metallocene-LLDPE (mLLDPE), and mixtures or blends thereof; and polypropylene or propylene co- or ter-polymers. One example of a suitable laminate layer is a polyethylene, for example LDPE of extrusion grade, for example having a melt flow index (as determined in accordance with ASTM D1238, 190° C./2.16 kg) of 2-13, such as 5-10, and a density (as determined in accordance with ISO 1183, method D) of 914-922 kg/m$^3$, such as 915-920 kg/m$^3$. The thickness of the laminate layer of the packaging material is for example between 5 µm-50 µm such as 10 µm-30 µm, such as 15 µm-30 µm, such as 17 µm-25 µm.

The barrier layer, such as oxygen barrier (e.g. aluminium foil or a polymer film such as a vapour deposition coated thermoplastic film) is arranged by help of the laminate layer on the side opposite the bulk layer. Optionally the bulk layer and/or the barrier layer can be treated or modified in order to achieve adhesion between the layers, in which case the laminate layer is not needed. For example a coating which modifies the surface of one or more of the substrates may be used. In some embodiment the barrier layer has an adhesive on the side opposite the optional laminate layer. The adhesive is within the capacity of those skilled in the art to select depending on desired properties and compatibility with the layer to which it is in contact. When the barrier layer is aluminium foil an example of adhesive is ethylene copolymers with comonomers having carboxylic acid functionality such as ethylene acrylic acid copolymer, for example marketed under the tradename Primacor® by Dow or Nucrel® by Dupont.

Generally the different layers present in the packaging material are possible to detect, for example by microscopy. It may not be possible to separate one or more of the layers, for example the adhesive from the heat-sealable layer, and thus in certain embodiments the layer forming the inside of the packaging container is a combination of the adhesive and the heat-sealable layer where the heat-sealable layer is facing the liquid or semi-liquid food product. The adhesive layer of the packaging material as described herein has a thickness between 3 µm-12 µm, such as 4 µm-10 µm such as 5 µm-9 µm. The adhesive layer may be characterized by different methods including for example infrared spectroscopy (IR).

The packaging material contains an innermost heat-sealable layer. An example of a heat-sealable layer is a heat-sealable polyolefin polymer which is applied as a layer to be directed towards the inside of the container, i.e. in direct food contact. The heat-sealable layer for the innermost layer may suitably be a polyethylene polymer of the low density type, selected from the group consisting of LDPE, LLDPE, VLDPE, ULDPE or mLLDPE and blends of two or more thereof. The arrangement of the heat-sealable layer is similar to the laminate layer and what was disclosed above in connection with the laminate layer applies also for the heat-sealable innermost layer. Depending on the type of packaging containers produced from the packaging material, also heat-sealable innermost layers of high density polyethylene, polypropylene or propylene co- or ter-polymers are conceivable within the scope of the appending claims as long as they are compatible with and achieve the desired effect in combination with other components of the packaging material and in particular the adhesive as described herein. Suitable examples to be used as innermost layers are blends between LDPE and mLLDPE (e.g. 50/50, 40/60, 60/40, 30/70, 70/30, 20/80, 80/20 weight % blend ratios), such as LDPE of extrusion grade, for example having a melt flow index (as determined in accordance with ASTM D1238, 190° C./2.16 kg) of 2-12, such as 2-7, such as 2-5.5 and a density (as determined in accordance with ISO 1183, method D) of 914-922 kg/m$^3$, such as 915-920 kg/m$^3$. Examples of mLLDPEs suitable for use in aspects and embodiments described herein have a density less than 0.922 kg/cm$^3$ and a melt flow index (MFI) of 15-25 at 190° C. and 2.16 kg (ASTM 1278). Additional details are well known and within the capacity of the skilled person, additional understanding can be obtained for example in U.S. Pat. No. 6,974,612. The thickness of the innermost layer of the packaging material is for example between 5 μm-50 μm, such as 10 μm-30 μm, such as 15 μm-30 μm, such as 17 μm-25 μm. Naturally, the above referred examples are working as a general guidance and also other polymers are possible.

Hence the above mentioned layers of the packaging material are for example and conventionally applied to the respective side of the bulk material by extrusion techniques.

Some embodiments thus relate to a packaging material comprising a decor layer which on one side of the layer has a bulk layer having a density of less than 700 kg/m$^3$ and comprises foamed cellulose, which on the side opposite the decor layer has a barrier layer, which on the side opposite the bulk layer has a heat-sealable layer. In some embodiments the barrier layer is arranged at the bulk layer by a laminate layer. The materials of the layers are selected from the layers described hereinabove. In some embodiments the packaging material is used to produce packaging containers for liquid or semi-liquid food. In some embodiments the packaging material comprises an additional layer between the bulk layer and the decor layer. In some embodiments the additional layer has a surface weight grammage of at least 20 g/m$^2$. If necessary, for example in order to achieve an improved adhesion between the additional layer and the bulk layer a binding layer is present. In some embodiments the binding layer is selected from materials listed under the description of the laminate layer. In some embodiments the additional layer is a paper layer or a polymer layer or film. In some embodiments the additional layer may be surface coated or surface modified in order to increase adhesion to the adjacent layers.

According to one possible production method the packaging container is obtained by providing a bulk layer having an optional print, and a suitable crease pattern, the bulk layer has a cut hole for an opening such that a packaging container will possess at least one hole (or attenuation). The above mentioned crease patterns serves as folding lines for forming the final package such as a Tetra Brik® Aseptic. An example of a crease pattern can for example be seen in FIG. 3 of WO2012/163753. The bulk layer is fed from a roll and the bulk layer web is optionally treated with heat and/or ozone. The laminate layer is arranged, on the side opposite the optional print, by help of a film of plastic exiting an extruder. Normally the extruded material has a temperature above 260° C., such as above 280° C., such as above 290° C., such as above 300° C. For some materials an extrusion lamination temperature above 290° C. are preferred. In order to further describe the extrusion FIG. 3 discloses a schematic illustration of an extruder (31) suitable for the arrangement of the laminate layer (13) on the bulk layer (12), additionally showing a molten plastic film (32) of the polymer to become the laminate layer (13) arranged on the bulk layer web (35). The extruder melts and mixes the polymer. In case of blends the extruder may also be used to blend the polymers which are for example supplied via separate hoppers. The molten film (32) and the bulk layer are joined in a nip between the rollers (33 and 34). The other polymer layers (adhesive and heat-sealable layer) are added to the bulk layer (35) using a similar arrangement. The barrier layer (14) may be arranged from a separate roll and arranged together with the laminate layer (13), or with an adhesive.

In one embodiment the packaging material described herein, and in the accompanying claims provides a packaging material which comprises a decor layer (11) which on one side of the layer has an additional layer (27), said additional layer has on the side opposite the decor layer a binding layer in order to arrange a bulk layer, said bulk layer (12), on the side opposite the decor layer (11) has a laminate layer (13), said laminate layer (13), on the side opposite the bulk layer (12) has an oxygen barrier (14), said oxygen barrier (14), on the side opposite the laminate layer (13) has an adhesive (15), and said adhesive (15), on the side opposite the oxygen barrier (14) has a heat-sealable layer (16). The packaging material is in one embodiment transformed into an aseptic packaging container. The transformation may be performed by pre-folding and sealing parts of the packaging material into a blank. Example of packages made from blanks are for example Tetra Recart® and gable top containers. The blank may be provided with an opening device and filled and sealed in a filling machine suitable to handle blanks. The transformation from a packaging material into a packaging container may also be performed using the continuous tubular-web form-fill-seal technology, for example in a Tetra Pak® A3 Speed/Flex. A packaging container formed from the packaging material according to the aspects and embodiments described herein may be of any known shape. In some aspects the container described herein relates to a substantially brick- or wedge-shaped container that is durable at handling and distribution and resistant to moisture and oxygen gas during long term storage, due to the high quality packaging material, which in turn also provides for sufficient seal quality and gas barrier properties. Further types of paperboard-based packages for liquid packaging where the aspects and embodiments described herein may be useful is a brick shaped packaging container, a gable top packaging container, a wedged-shape packaging container, a square-, rectangular- or octagonal-based packaging container. More specifically the so called, Tetra Brik®, Tetra Brik® Aseptic, Tetra Brik® Edge, Tetra Gemina® Aseptic, Tetra Prisma® Aseptic, Tetra Rex®, and Tetra Top® and Tetra Evero® packages or other kinds of bottle-like packages comprising a sleeve of the paperboard-based packaging material, a fold-formed bottom thereof, and a top and screw cap of a plastic mould-shaped material. One embodiment described herein relates to a Tetra Brik® packages of a known size such as 200 ml, 250 ml, 500 ml, and 1000 ml which optionally may have a squared base, or a slanted top such as for example Tetra Brik® Edge.

It has been generally concluded that the amount of cellulose fibres may be reduced significantly in the laminated packaging material of the invention, while it nevertheless has maintained mechanical properties and suitability for food packaging in general, and for liquid carton packaging in particular. Additionally, detailed descriptions of embodiments are disclosed in connection with the description of embodiments.

EXAMPLES

Aqueous cellulose pulp was blended from about 75 wt % spruce CTMP fibres with CSF (Canadian Standard Freeness) value of 530 ml with about 25 wt % of bleached softwood chemical pulp to a concentration of about 3-4%. A foaming fluid was prepared by mixing about 2 wt % of sodium dodecyl sulphate SDS into water. After stirring and simultaneous addition of pressurized air, until a suitable foam was created, the fibre dispersion was added into the foam under continuous stirring and mixing. The thus obtained fibrous foam was pressed through a nozzle (headbox) and shaped into a coating onto a moving web of porous felt to drain off the water and the thus web-shaped foam sheet was subsequently dried.

In a first specific embodiment, the properties of foamed cellulose, in the lamination operation during the conversion of packaging materials into a laminated packaging material, was investigated.

In order to analyze the effect of thermal and mechanical loading on the foamed cellulose during lamination, tests were conducted on various low density materials. The materials tested were foamed cellulose, and foamed polypropylene. Lamination of packaging material structures was done in a flexible lab laminator with two extrusion coating stations. The laminator settings were about 100 m/min web speed, 250-275 N web tension and the reference nip load was 25 N/mm. In each extrusion coating operation, 15-20 g/m$^2$ of LDPE was melt extruded onto the layer of foamed cellulose on the respective sides, at a melt extrusion temperature of about 320° C. The original thickness before lamination and the thickness after lamination were optically measured by using a microscope Olympus BX51. Sample preparation was done by using a microtome.

In FIG. 6 the resulting thickness reductions are shown. For example the ID "FC 300 2x" means that a foamed cellulose of density 300 kg/m$^3$ was laminated with a nip load twice as large as the reference nip load. Generally, it can be seen that the remaining thickness of foamed cellulose is substantially higher compared to the laminate variant with foamed polymer materials.

It was also concluded that lamination by extrusion coating works well with foamed cellulose having a density of 300 kg/m$^3$ or higher. Laminates having low weight layers of foamed cellulose are more sensitive to lamination heat and pressure, and show higher reduction of the thickness of the foamed cellulose material.

Furthermore, the thickness reduction of a polymer foam is permanent, due to melting and re-shaping of the heated polymer foam cells, while there is a spring-back effect in the foamed cellulose, such that the thickness reduction during lamination is reversed to a final thickness which is only reduced by about 10-15% in the reference nip at densities around 300-400 kg/m$^3$. The higher the density of a foamed cellulose, the better this spring-back effect, or ZD compression strength.

In a second specific embodiment packaging containers of the type Tetra Brik® 250 ml were prepared from a laminated packaging material having a bulk layer from a foam produced accordingly. The packaging material comprised 12 g/m$^2$ decor layer of an LDPE, which is arranged to become the outside of the package. Additional layers starting from the decor layer were: 70 g/m$^2$ white paper; 15 g/m$^2$ LDPE as binding layer; a bulk layer of foamed cellulose, 332 kg/m$^3$, 243 µm; a laminate layer of 20 g/m$^2$ LDPE and a barrier layer of about 6 µm aluminium foil, 6 g/m$^2$ adhesive (Primacor™ 3440) and 19 g/m$^2$ heat-sealing layer of a blend of a LDPE (30 w %) and a metallocene catalyzed linear, low density polyethylene. The packaging material was obtained on a roll which was processed in accordance with the conventional manufacturing process in order to generate a 250 ml Tetra Brik® packaging containers containing orange juice. From this test, it was concluded that the amount of cellulose fibres could be reduced by 25%, as compared to a corresponding material having one conventional paperboard layer in a corresponding traditional packaging laminate with 12 g/m$^2$ LDPE decor, 200 g/m$^2$ paperboard, 20 g/m$^2$ LDPE laminate layer, 6 µm aluminium foil, 6 g/m$^2$ adhesive (Primacor™ 3440) and 19 g/m$^2$ heat sealing layer of a blend of a LDPE (30 w %) and a metallocene catalyzed linear, low density polyethylene.

Moreover, in addition to reducing amount of material used in the laminated packaging material, the bulk layer is still based on natural, renewable sources, i.e. cellulose.

In order to determine the density of the bulk layer different procedures may be applicable depending on the layers of the packaging material. The density (kg/m$^3$) of the bulk layer comprising foamed cellulose in a multilayered packaging material can be determined by dividing the grammage (kg/m$^2$) by the thickness (m). The thickness can be obtained by using a standard microscope. The separate grammage can be obtained by a standardized separation procedure using 1 dm$^2$ circular discs of packaging material. All measurements are performed in a controlled environment of 23° C. and 50% relative humidity. The total grammage of the packaging material is measured using a balance (0.001 g accuracy). The packaging material is split at the foamed cellulose layer to obtain two plies. The two plies are place in a beaker containing copper ethylene diamine solution until all the cellulose fibers are easily removed. Thereafter the remaining grammage is determined and the foamed cellulose grammage can be calculated by subtracting the remaining grammage from the total grammage. Whenever at least one of the plies contain an aluminium layer the procedure should be to measure the grammage of each ply and use an acetic acid solution instead of the copper ethylene diamine solution and leave the plies for 3 to 4 hours. The layers of the plies of packaging material are split to individual layer and the corresponding individual layer grammage is determined and subtracted from the total grammage. Whenever an additional layer of paper is present the method above is applied but the paper layer is removed, for example by grinding. The weight of the ground material is determined and appropriately corrected in the density calculation of the bulk layer.

Crosslinking Examples

Example UV

Tests were performed on a foamed cellulose by using a crosslinking mixture of ethanol, TMPTA (shown in the figures as triacrylate) or dipentaerythritol pentaacrylate (shown in the figures as pentaacrylate) and HCHPK as photoinitiator. The foamed cellulose was soaked in the crosslinking mixture for about 15 seconds. Thereafter the foamed cellulose was dried at a temperature of about 70° C. The soaked and dried foamed cellulose was thereafter subjected to UV radiation. The added amounts of added crosslinking materials were established by weighing the foamed cellulose sheet before and after soaking and drying. The percentages are in relation to the weight of the sheet before the addition of the additives. The UV equipment provided with a lamp power of 120 Watt/cm and 1800 Watts in total. The conveyer speed was about 0.9-8.6 m/min, and single or multiple passages were investigated. The total exposure time varied with 5.3-26.3 seconds. Measurements of delamination strength and Edge Wick Index were made. The density increased with increasing amount of added crosslinking mixture, e.g. from about 332 for the reference up to at most 685 kg/m$^3$. The crosslinking between the cellulose fibres aided by the addition of the crosslinking mixture and irradiation improved delamination strength of the foamed cellulose.

FIG. 7 shows the difference between reference foamed cellulose and crosslinked foamed cellulose (provided with TMPTA and photoinitiator). It is clear that one pass compared to multiple passes at the same exposure time provides a much higher strength. The reference values, non-UV and UV, does not meet the desired delamination strength properties.

FIG. 8 shows that by increasing the amount of crosslinking (tri or penta)acrylate to the foamed cellulose the more the delamination strength strength increases. As it is preferred not to have a too high delamination strength due to too high crosslinking degree and thus obtaining a brittle material. Also the too high delamination strength would influence the recyclability of the material.

FIG. 9 shows the difference between reference foamed cellulose and crosslink foamed cellulose (provided with TMPTA and photoinitiator). The difference between the embodiments according to the invention in this figure is the amount of additives and manner of UV exposure. It is clear that a crosslinking of the foamed cellulose positively influence the edge wick index.

FIG. 10 shows that by increasing the amount of crosslinking (tri or penta)acrylate to the foamed cellulose the more the edge wick index decreases.

Example EB

A liquid solution of water and strength additive was used to impregnate the sheets. The crosslinkable strength additives used where starch and CMC. In one case citric acid was added to the CMC-water solution.

The sheets where soaked for 15 seconds and then dried unrestrained on a flat surface at 23° C. for 24 hours.

The weight of each individual sheet was determined before and after soaking and drying. This was then used to calculate the corresponding weight fraction of the strength additives.

Sheets where then moisturized with a spray foam of water and directly after that exposed to EB radiation on both sides. The radiation setting was 100 keV and 200 kGray.

After radiation exposure the sheets where dried unrestrained on a flat surface at 23° C. for 24 hours.

Finally the delamination strength was measured for the different variants.

The results shows that the strength additives improve the delamination strength significantly for all cases. The improvement is higher for the case of CMC.

The EB exposure had a significant effect when starch was used as crosslinkable strength additive. In the case when citric acid was combined with CMC the delamination strength slightly increased after EB exposure.

FIG. 11 shows the difference between reference foamed cellulose and foamed cellulose provided with starch, with and without EB radiation. It is clear that when EB radiation was used a much higher delamination strength was provided compared to reference material and material not irradiated material.

FIG. 12 shows the difference between reference foamed cellulose and foamed cellulose provided with CMC, with and without EB radiation. It is clear that when CMC was used a higher delamination strength was provided compared to reference material. Upon use of EB radiation an addition of citric acid improved the delamination strength further.

DESCRIPTION OF THE DRAWINGS

Further advantages and favorable characterizing features will be apparent from the following detailed description, with reference to the appended figures, in which.

GENERAL DESCRIPTION OF EMBODIMENTS

Figure 1A:
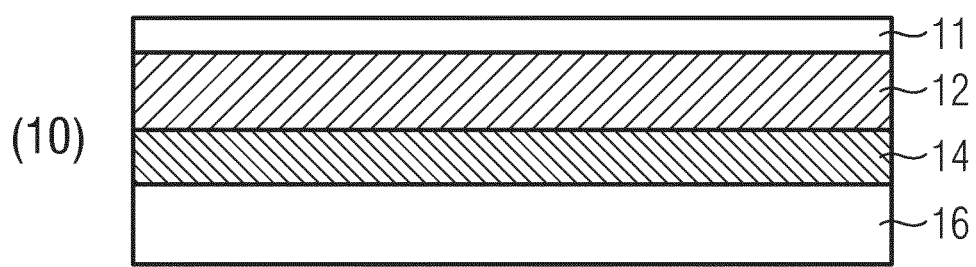
FIGS. 1a and 1b are cross-sectional views of laminated packaging materials according to aspects described herein.

FIG. 1a schematically shows a cross-section of a packaging material. The decor layer (11) is a polyolefin such as a suitable LDPE or PP. The decor layer may for example be used to provide cover of a printed pattern, a hole and/or weakening (not shown in the figure) provided in any of the other layers. On one side of the decor layer a bulk layer (12) is arranged. On the other side of the bulk layer, opposite to the decor layer, a barrier layer (14) is arranged. Between the barrier layer and the bulk layer an optional laminate layer can be arranged if needed. Similarly one or both the layers may be surface modified or contain a coating in order to provide for sufficient adhesion between the bulk and barrier layer. The barrier layer (14) provides a desired barrier such as oxygen, light, water and vapour barrier depending on the specific need determined by the product to be packed. The barrier layer can for example be an aluminium foil or a vapour deposited film, such as a metallized or vapour deposition coated, such as PECVD coated, film. On the side opposite the bulk layer the barrier layer is arranged with a heat-sealable layer (16) such as a suitable polyolefin such as PE or PP or blends thereof. Between the barrier layer and the heat-sealable layer an adhesive may be used when needed. The heat-sealable layer is the layer facing the product in the finished packed packaging container.

Figure 1B:
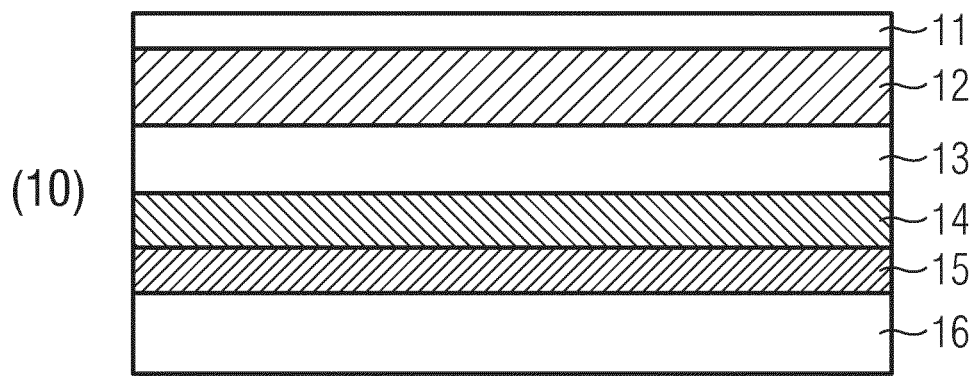

FIG. 1b schematically shows a cross-section of a packaging material. The decor layer (11) is a polyolefin such as a suitable LDPE or PP. The decor layer may be used to provide cover of a printed pattern, a hole and/or weakening (not shown in the figure) which is provided on the bulk layer (12), which layer is arranged on one side of the decor layer (11). The bulk layer (12), on the side opposite the decor layer, has a laminate layer (13) selected from suitable polyolefins such as LDPE or PP. The laminate layer provides adhesion to the oxygen barrier (14), which is arranged on the opposite side of the bulk layer (13). The barrier layer (14) provides the desired barrier such as oxygen, light, water and vapour barrier depending on the specific need determined by the product to be packed. The barrier layer can for example be an aluminium foil or a vapour deposited film, such as a metallized or vapour deposition coated, such as PECVD coated film. On the side opposite the laminate layer an adhesive polymer (15) is arranged on the barrier layer. The adhesive polymer (15) may for example be applied by extrusion coating. When the barrier layer is aluminium foil the adhesive could be a suitable adhesive such as an ethylene (meth)acrylic acid copolymer (E(M)AA) marketed under the tradename Primacor® or Nucrel®. On the side opposite the barrier layer, the adhesive is provided with a heat-sealable layer (16) such as a suitable polyolefin such as PE or PP or blends thereof. The heat-sealable layer is the layer facing the product in the finished packed packaging container.

Figure 2A:
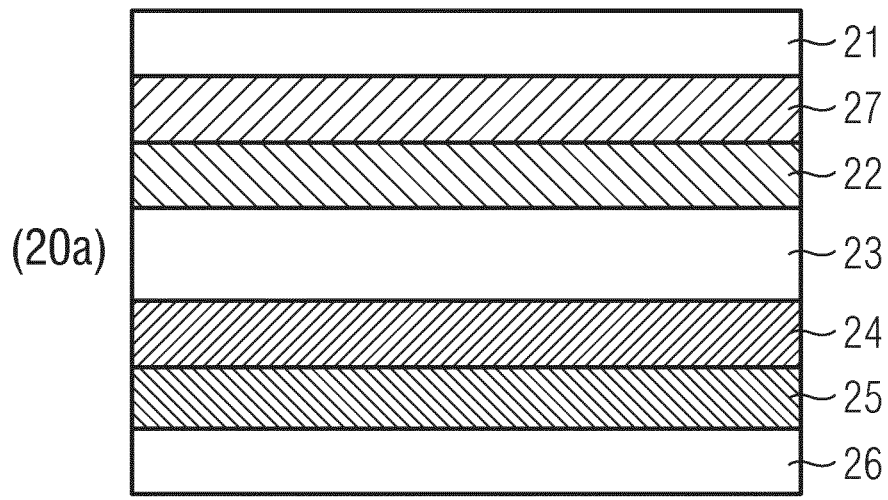
FIGS. 2a and 2b are cross-sectional views of laminated packaging materials according to aspects described herein.

FIG. 2a schematically shows a cross-section of a packaging material. The decor layer (21) is a polyolefin such as a suitable LDPE or PP. The decor layer may be used to provide cover of a printed pattern, a hole and/or weakening (not shown in the figure) which is provided in the bulk layer (22), which layer is arranged on one side of the decor layer (21). Between the decor layer (21) and the bulk layer (22) an additional layer (27) of paper or cellulose is arranged. The bulk layer (22), on the side opposite the decor layer, has a laminate layer (23) selected from suitable polyolefins such as LDPE or PP. The laminate layer provides adhesion to the oxygen barrier (24), which is arranged on the opposite side of the laminate layer (23). The barrier layer (24) provides the desired barrier such as oxygen, light, water and vapour barrier depending on the specific need determined by the product to be packed. The barrier layer can for example be an aluminium foil or a vapour deposited film, such as a metallized or vapour deposition coated film, such as a PECVD (plasma enhanced chemical vapour deposition) coated film. On the side opposite the laminate layer an adhesive polymer (25) is arranged on the barrier layer. The adhesive (25) may for example be applied by extrusion coating. When the barrier layer is aluminium foil the adhesive could be a suitable ethylene (meth)acrylic acid copolymer (E(M)AA) adhesive marketed under the tradename Primacor® or Nucrel®. On the side opposite the barrier layer, the adhesive is provided with a heat-sealable layer (26) such as a suitable polyolefin such as PE or PP or blends thereof. The heat-sealable layer is the layer facing the product in the finished packed packaging container.

Figure 2B:
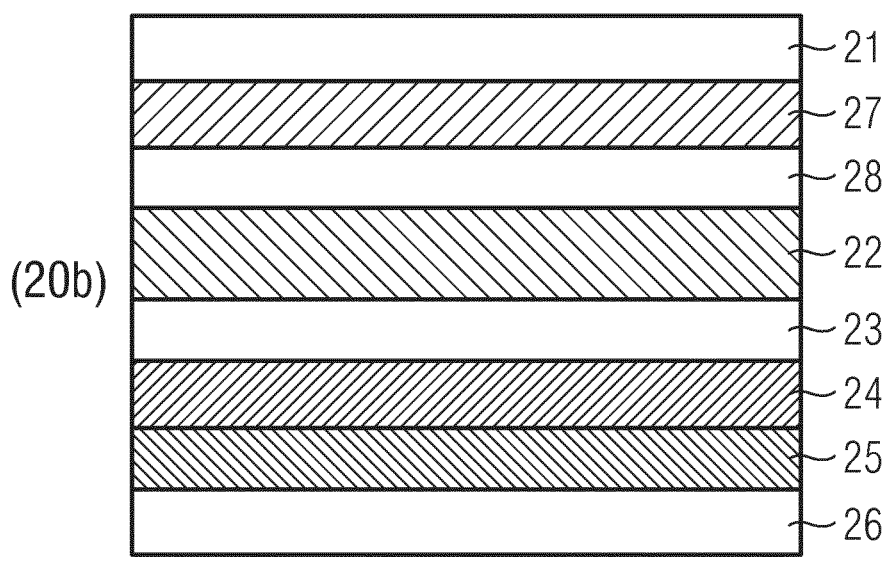
Figure 3:
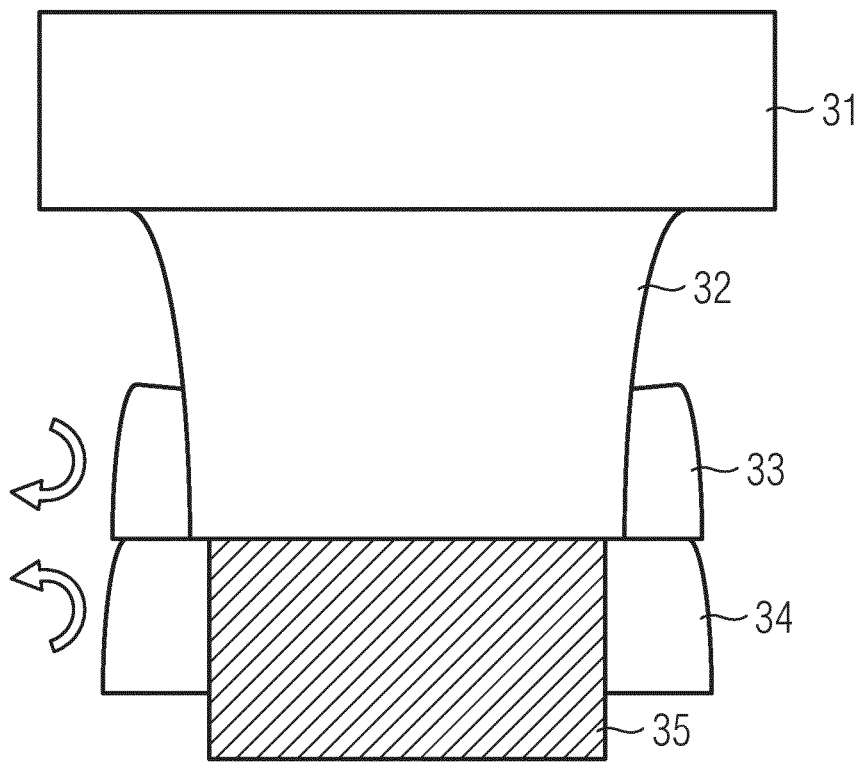
FIG. 3 is a schematic drawing of an extruder, the extruded film, a paper or packaging material web and the rollers arrange to join the plastic and the bulk layer.

FIG. 2b schematically shows a cross-section of a packaging material. The decor layer (21) is a polyolefin such as a suitable LDPE or PP. The decor layer may be used to provide cover for a printed pattern, a hole and/or weakening (not shown in the figure) which is provided in one or more of the other layers of the laminate. On one side of and adjacent the decor layer, a thin paper (27) of a surface weight of about 100 g/m² or lower is arranged. The thin paper layer (27) is laminated to a bulk layer (22), opposite the decor layer, by an intermediate thermoplastic outer binding layer (28). The binding layer (28) may be selected from suitable polyolefins such as LDPE or PP or blends thereof. The binding layer (28) binds the bulk cellulose layer (22) and the thin paper layer (28) together. The bulk layer (22), is further laminated to a laminate layer (23) of thermoplastic polymer, on the side of the bulk layer opposite the side laminated to the binding layer (28). The laminate layer (23) provides adhesion to an oxygen barrier layer (24), which is arranged on the opposite side of the laminate layer (23). The barrier layer (24) provides the desired barrier such as oxygen, light, water and vapour barrier depending on the specific need determined by the product to be packed. The barrier layer can for example be an aluminium foil or a vapour deposited film, such as a metallized or vapour deposition coated film, such as a PECVD coated film. On the side opposite the laminate layer an adhesive polymer (25) is arranged on the barrier layer. The adhesive (25) may for example be applied by extrusion coating. When the barrier layer is aluminium foil the adhesive could be a suitable ethylene (meth)acrylic acid copolymer (E(M)AA) adhesive marketed under the tradename Primacor® or Nucrel®. On the side opposite the barrier layer, the adhesive is provided with a heat-sealable layer (26) such as a suitable polyolefin such as PE or PP or blends thereof. The heat-sealable layer is the layer facing the product in the finished packed packaging container. FIG. 3 is a schematic illustration of an extruder (31). An extruder of the schematic illustration is suitable for application of the, decor layer (11), laminate layer (13), adhesive (15) and the heat-sealable layer (16). As an example the laminate layer (13) can be applied on the bulk layer (12), whereby the drawing shows a molten plastic film (32) of the polymer to become the laminate layer (13) being arranged by melt extrusion coating onto a bulk layer web (35). The extruder melts and mixes the polymer(s). In case of the layers being polymer blends, the extruder may also be used to blend the polymers which are for example supplied via separate hoppers for the polymer granules. The molten film (32) and the bulk layer are joined in a lamination nip between rollers (33 and 34) which exert a pressure. One of the rollers can be a chilled roller which reduces the temperature of the polymer when in the nip. Similarly the other polymers of the packaging material may be added to the bulk layer (35). The barrier layer (14) may for example be forwarded from a separate roll and fed through the lamination nip together with the laminate layer (13), or with an adhesive.

Figure 4:
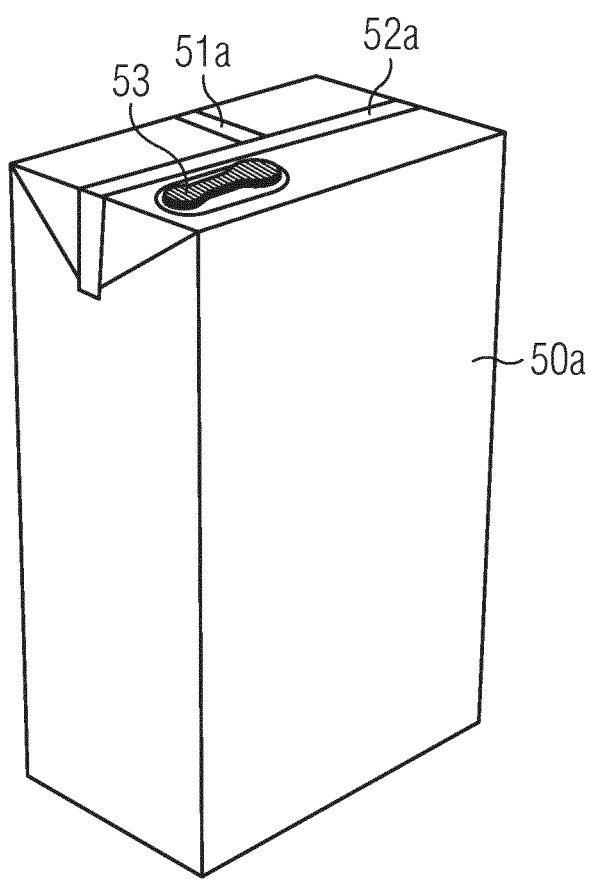
FIG. 4 shows examples of packaging containers produced from the packaging material according to embodiments described herein.

FIG. 4 shows an example of a packaging container 50a produced from the packaging material described in FIG. 1 or 2. The packaging container is particularly suitable for liquid or semi-liquid food products such as beverages, sauces, soups or the like. Typically, such a package has a volume of from about 100 to about 2000 ml. It may be of any configuration such as those previously described herein, but is for example brick-shaped, having longitudinal and transversal seals 51a and 52a, respectively, and optionally an opening device 53. In another embodiment, not shown, the packaging container may be shaped as a wedge. In order to obtain such a "wedge-shape", only the bottom part of the package is fold formed such that the transversal heat-seal of the bottom is hidden under the triangular corner flaps, which are folded and sealed against the bottom of the package. The top section transversal seal is left unfolded. In this way the half-folded packaging container is still easy to handle and dimensionally stable (i.e. substantially maintains form and shape) when put on a shelf in the food store or on a table or the like.

Figure 5:
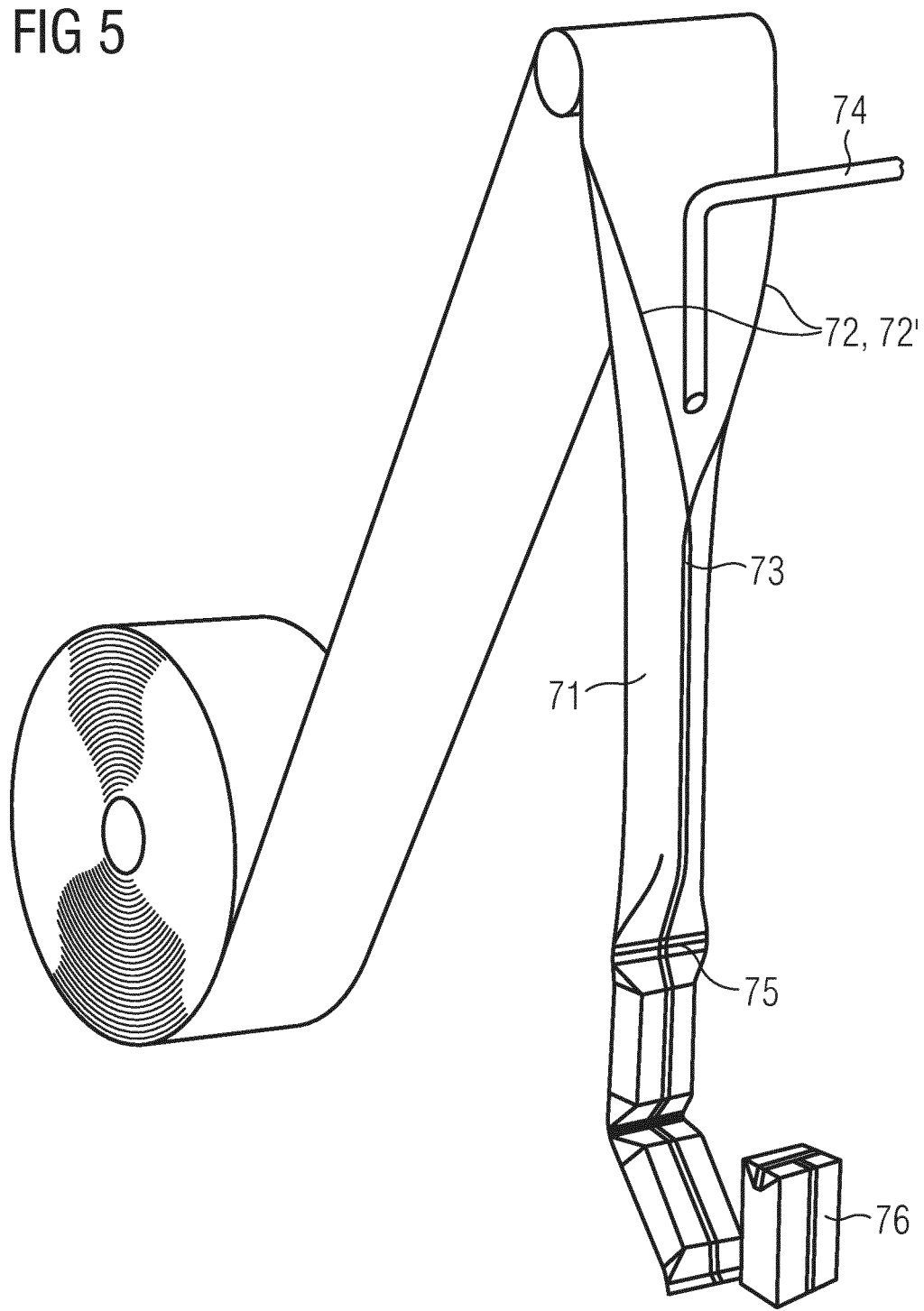
FIG. 5 shows the principle of how such packaging containers are manufactured from the packaging material in a continuous forming, filling and sealing process.
Figure 6:
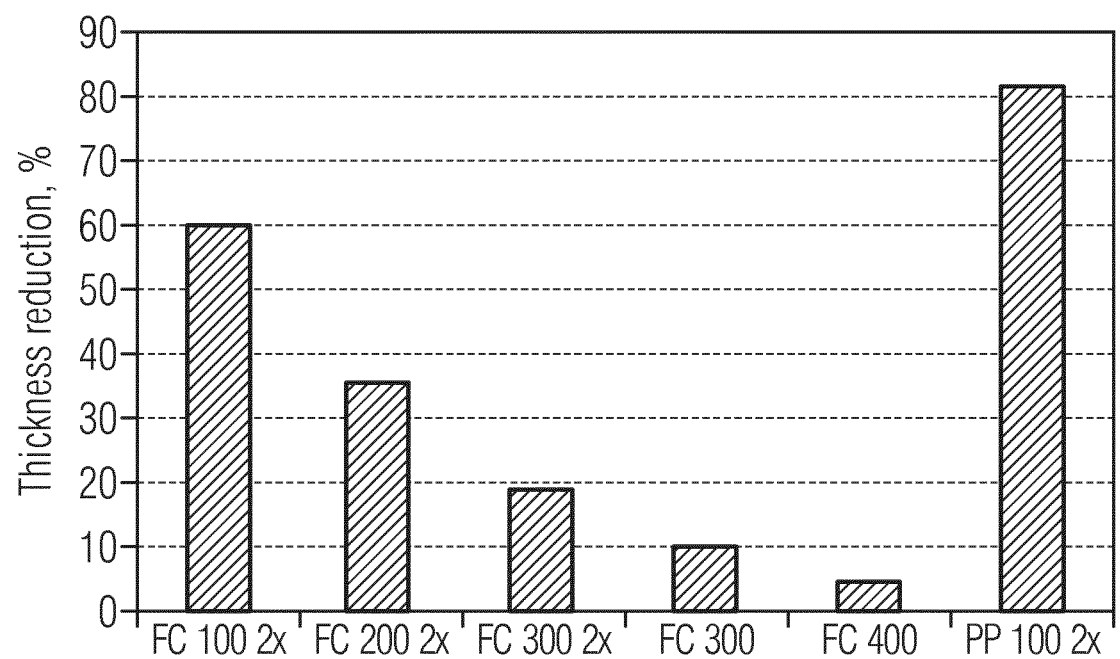
FIG. 6 shows resulting thickness reductions of lamination materials comparing the original thickness before lamination and the thickness after lamination.
Figure 7:
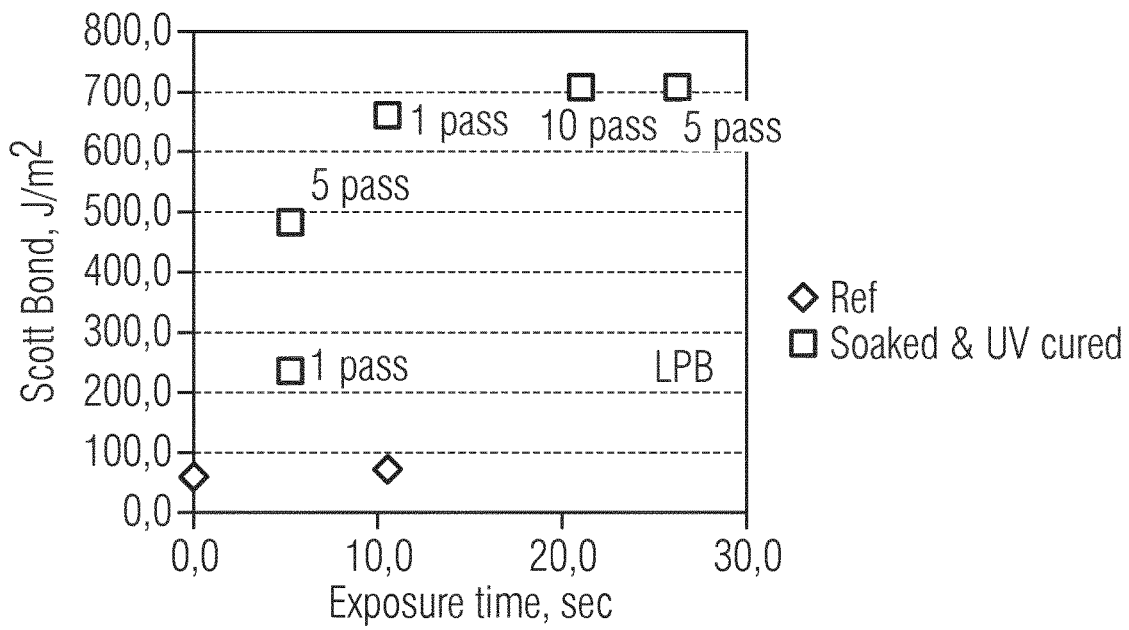
FIG. 7 shows the influence of exposure time on the delamination strength.
Figure 8:
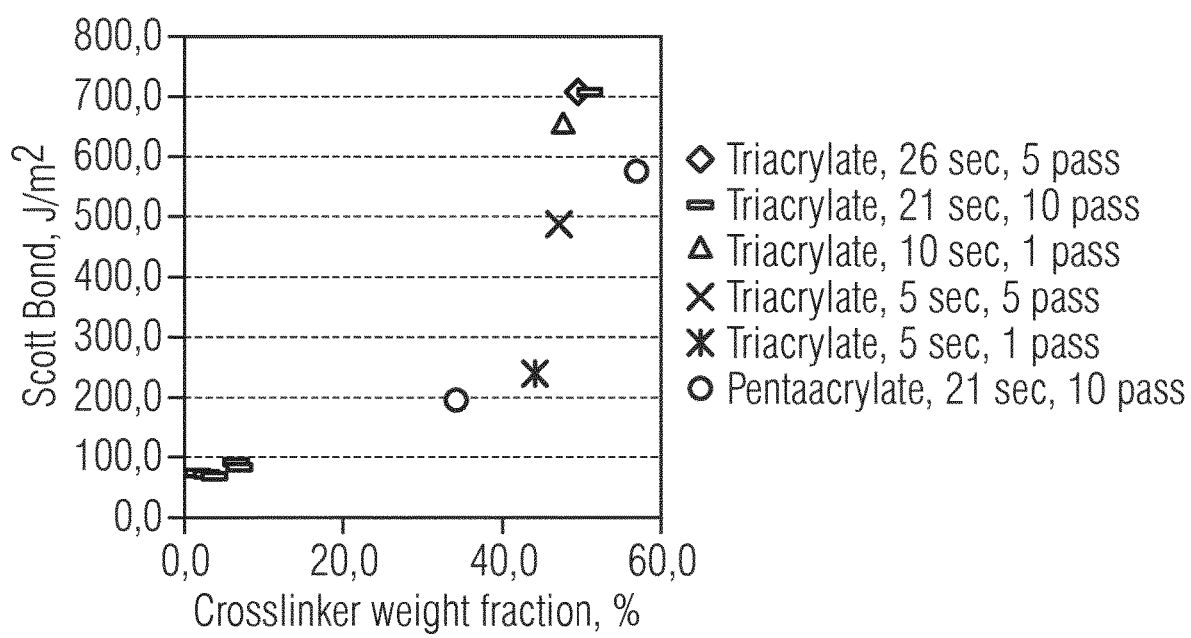
FIG. 8 shows the influence of amount of crosslinker material on the delamination strength.
Figure 9:
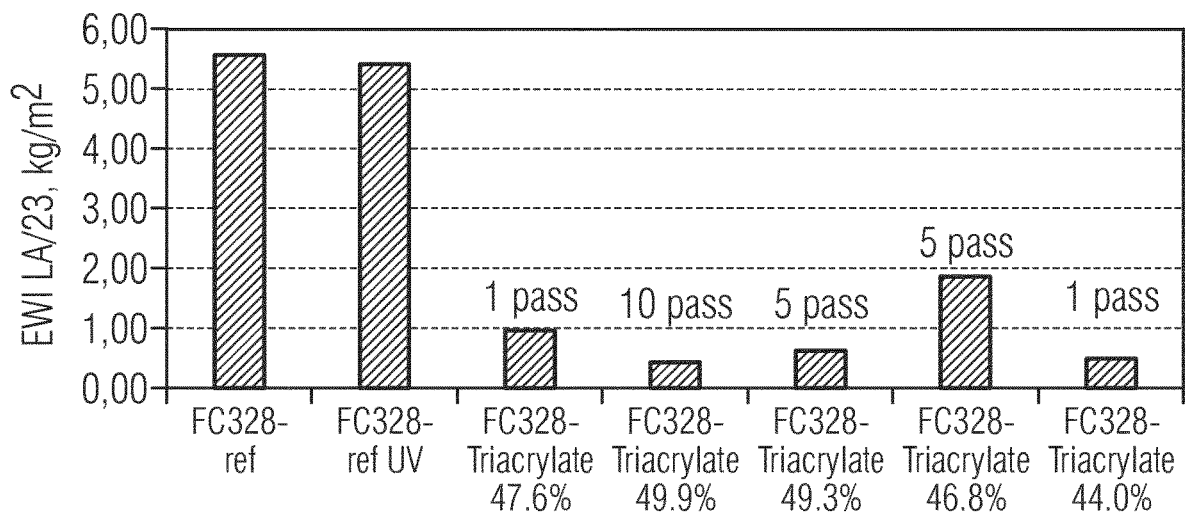
FIG. 9 shows the influence of amount of crosslinker material and exposure time on the edge wick index.
Figure 10:
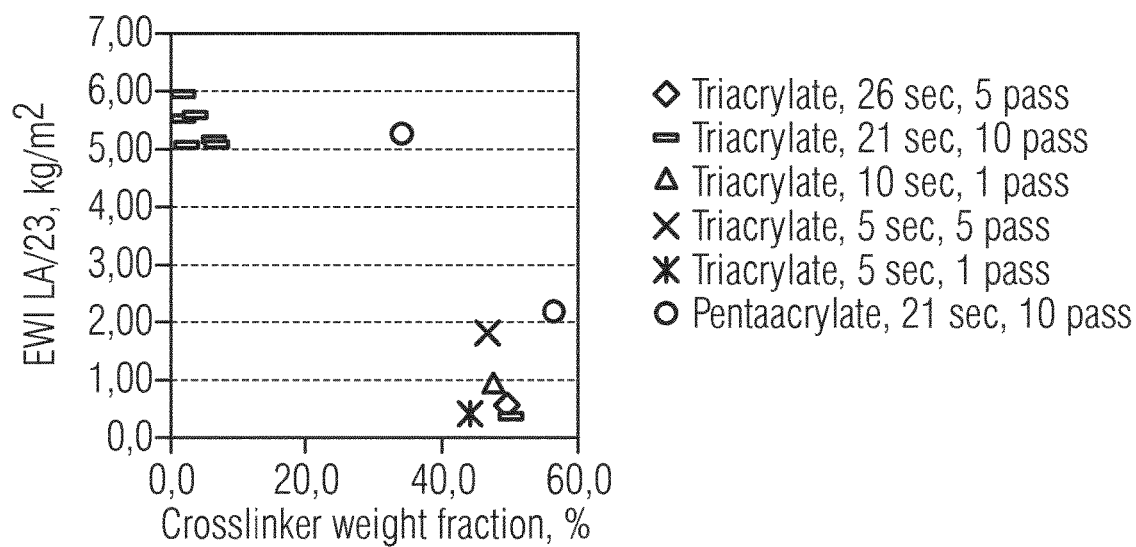
FIG. 10 shows the influence of amount of crosslinker material on the edge wick index.
Figure 11:
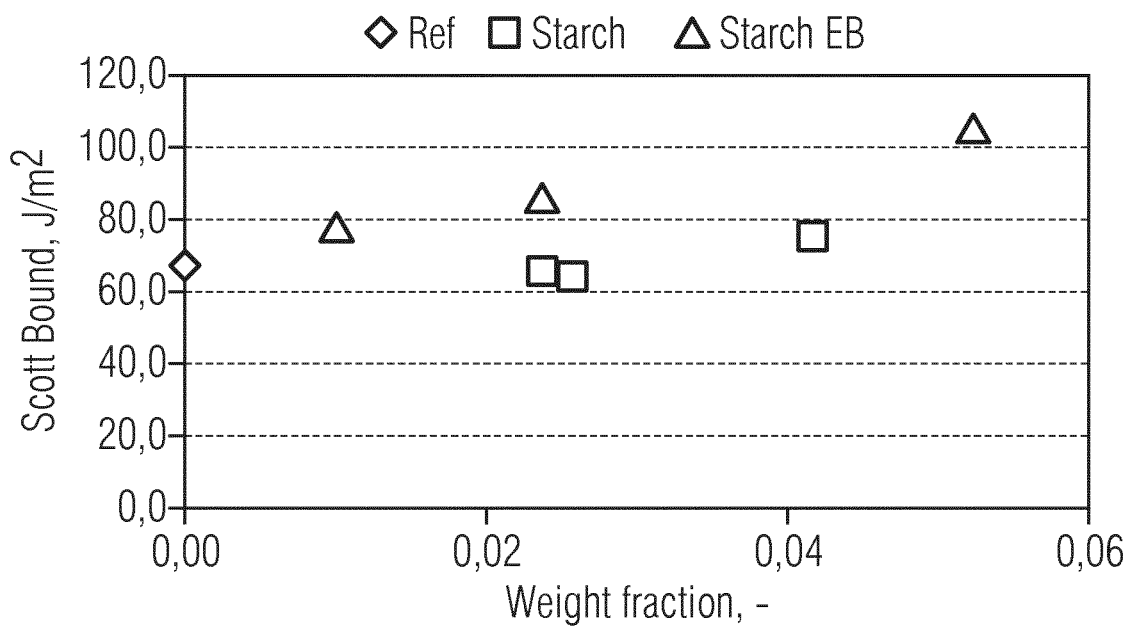
FIG. 11 shows the influence of amount of crosslinker material on the delamination strength with and without EB.
Figure 12:
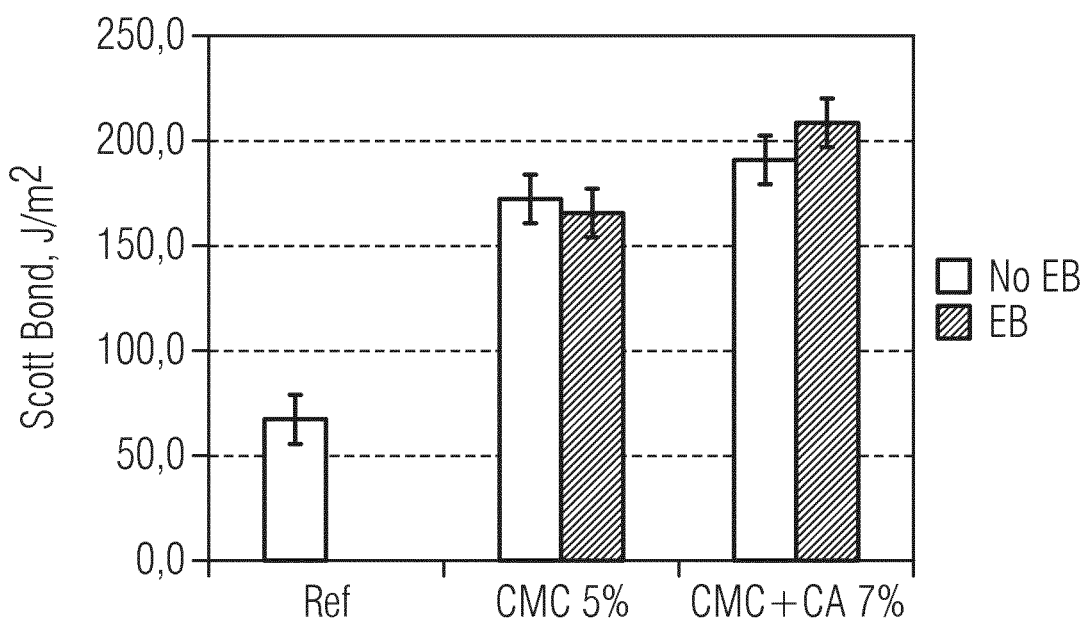
FIG. 12 shows the influence of crosslinker material on the delamination strength.

FIG. 5 shows the principle as described in the introduction of the present application, i.e. a web of packaging material is formed into a tube 71 by the longitudinal edges 72, 72' of the web being united to one another in an overlap heat-sealed joint 73. The tube is filled 74 with the intended liquid food product and is divided into individual packages by repeated transversal seals 75 of the tube at a pre-determined distance from one another below the level of the filled contents in the tube.

The packages 76 are separated by incisions in the transversal seals and are given the desired geometric configuration by fold formation along prepared crease lines in the material.

The invention is not limited by the embodiments shown and described above, but may be varied within the scope of the claims. Modifications and alterations, obvious to a person skilled in the art, are possible without departing from the concept as disclosed in the appended claims.

Embodiments

A packaging material for a packaging container for liquid or semi-liquid food, comprising a decor layer (11) which on one side of the layer has a bulk layer (12) having a density of less than 700 kg/m$^3$ and crosslinked foamed cellulose of at least 25% thickness of the bulk layer, which on the side opposite the decor layer (11) has a barrier layer (14), which on the side opposite the bulk layer (12) has a heat-sealable layer (16).

The packaging material comprising an adhesive between the heat-sealable layer and the barrier layer.

The packaging material comprising a laminate layer between the bulk layer and the barrier layer.

The packaging material comprising an additional layer between the decor layer and the bulk layer.

The packaging material, wherein the additional layer is a paper or paperboard layer or an oriented polymer film.

The packaging material, wherein the additional layer is a paper layer having a grammage of at least 20 g/m$^2$. The packaging material comprising a binding layer between the additional layer and the bulk layer.

The packaging material wherein the bulk layer has a density from 100 to 600 kg/m$^3$, such as from 100 to 500 kg/m$^3$, such as from 200 to 500 kg/m$^3$, such as from 300 to 500 kg/m$^3$, such as from 300 to 400 kg/m$^3$.

The packaging material, wherein the bulk layer has a surface weight grammage of at least 20 g/m$^2$, such as at least 60 g/m$^2$, such as between 60 and 250 g/m$^2$.

The packaging material, wherein the decor layer is selected from heat-sealable polyolefin layer(s) selected from the group consisting of low-density polyethylene (LDPE), linear low-density polyethylene (LLDPE), very low-density polyethylene (VLDPE), ultra low-density polyethylene (ULDPE) or LLDPE manufactured by using metallocene catalysts (mLLDPE) and blends of two or more thereof; high density polyethylene (HDPE); polypropylene or propylene co- or ter-polymers.

The packaging material, wherein the laminate layer and the heat-sealable layer are individually selected from the group consisting of low-density polyethylene (LDPE), high-density polyethylene (HDPE), medium-density polyethylene (MDPE), linear low-density polyethylene (LLDPE), very low-density polyethylene (VLDPE), ultra low-density polyethylene (ULDPE) or LLDPE manufactured by using metallocene catalysts (mLLDPE) and blends thereof; and polypropylene or propylene co- or ter-polymers.

The packaging material, wherein the oxygen barrier is selected from the group consisting of aluminium foil and vapour deposition coated film, such as metallized or chemical vapour deposition coated film.

The packaging material, wherein the packaging material has a delamination strength of 120-300 J/m$^2$ as determined in accordance with TAPPI T569.

A packaging container manufactured from a packaging material according to the present invention, wherein the packaging container is a container for liquid or semi-liquid food product.

The packaging container, wherein the packaging container is a brick shaped packaging container, a gable top packaging container, a wedged-shape packaging container, a square-, rectangular- or octagonal-based packaging container, or a pouch.

A method of providing a packaging material for a packaging container for liquid or semi-liquid food, wherein the method comprises
  providing foamed cellulose;
  crosslinking the foamed cellulose by
    a) contacting with a crosslinking mixture comprising a polymeric and/or monomeric material and optionally a photoinitiator, and/or
    b) at least partially functionalising the foamed cellulose and optionally providing a photoinitiator,
  and subjecting to radiation to provide a crosslinked foamed cellulose; providing a bulk layer having a density of less than 700 kg/m$^3$ and comprising the crosslinked foamed cellulose;
  providing a polyolefin decor layer on one side of the bulk layer;
  providing a barrier layer on the side opposite the decor layer;
  providing a heat-sealable layer on the barrier layer, on the side opposite the bulk layer; and
  wherein the packaging material is obtained by extrusion lamination and/or heat-pressure lamination.

The method additionally comprising a step of providing an adhesive between the heat-sealable layer and the barrier layer.

The method additionally comprising a step of providing a laminate layer between the bulk layer and the barrier layer.

The method additionally comprising a step of providing an additional layer between the decor layer and the bulk layer.

The method wherein the additional layer is a paper or paperboard layer or an oriented polymer film.

The method wherein the additional layer is a paper layer having a grammage of at least 20 g/m$^2$.

The method additionally comprising a step of providing a binding layer between the additional layer and the bulk layer.

The method, wherein the bulk layer has a density from 100 to 600 kg/m$^3$, such as from 100 to 500 kg/m$^3$, such as from 200 to 500 kg/m$^3$, such as from 300 to 500 kg/m$^3$, such as from 300 to 400 kg/m$^3$.

The method, wherein the bulk layer has a surface weight grammage of at least 20 g/m$^2$, such as at least 60 g/m$^2$, such as between 60 and 250 g/m$^2$.

The invention claimed is:

1. A packaging material for a packaging container for liquid or semi-liquid food, the packaging material comprising a decor layer, a bulk layer on one side of the decor layer, a barrier layer on a side of the bulk layer opposite the decor layer, and a heat-sealable layer on a side of the barrier layer opposite the bulk layer so that the bulk layer is positioned between the decor layer and the barrier layer while the barrier layer is positioned between the bulk layer and the heat-sealable layer, the bulk layer having a density of at least 100 kg/m$^3$ and less than 700 kg/m$^3$ and being comprised of crosslinked foamed fibrous cellulose of at least 25% thickness of the bulk layer.

2. The packaging material according to claim 1, wherein the packaging material has a delamination strength of 120-300 J/m$^2$ as determined in accordance with TAPPI T569.

3. A packaging container manufactured from a packaging material according to claim 1, wherein the packaging container is a container for liquid or semi-liquid food product.

4. The packaging container according to claim 3, wherein the packaging container is a brick shaped packaging container, a gable top packaging container, a wedged-shape packaging container, a square-, rectangular- or octagonal-based packaging container, or a pouch.

5. The packaging material according to claim 1, wherein the bulk layer has a density from 300 kg/m$^3$ to 500 kg/m$^3$.

6. The packaging material according to claim 1, wherein the bulk layer has a density from 100 kg/m$^3$ to 600 kg/m$^3$.

7. The packaging material according to claim 1, wherein the fibrous cellulose is selected from the group consisting of chemical pulp fibers, chemi-thermomechanical pulp fibers, thermo-mechanical pulp fibers, and Kraft pulp fibers.

* * * * *